US009098638B2

(12) United States Patent
Howard

(10) Patent No.: US 9,098,638 B2
(45) Date of Patent: Aug. 4, 2015

(54) SYSTEM AND METHOD FOR AUTOMATIC TEST LEVEL GENERATION

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 235 days.

(21) Appl. No.: 13/913,160

(22) Filed: Jun. 7, 2013

(65) Prior Publication Data

US 2013/0332777 A1    Dec. 12, 2013

Related U.S. Application Data

(60) Provisional application No. 61/656,835, filed on Jun. 7, 2012.

(51) Int. Cl.
*G06F 11/00* (2006.01)
*G06F 11/36* (2006.01)

(52) U.S. Cl.
CPC ................................ *G06F 11/3692* (2013.01)

(58) Field of Classification Search
CPC ............ G06F 11/3692; G06F 11/3684; G06F 11/368; G01R 31/318544; G01R 31/31707; G05B 19/41875
See application file for complete search history.

(56) References Cited

U.S. PATENT DOCUMENTS

| | | | |
|---|---|---|---|
| 2003/0014734 A1* | 1/2003 | Hartman et al. | 717/125 |
| 2005/0160321 A1* | 7/2005 | Cleaveland et al. | 714/38 |
| 2005/0251432 A1* | 11/2005 | Barker et al. | 705/7 |
| 2006/0010428 A1* | 1/2006 | Rushby et al. | 717/124 |
| 2007/0079189 A1* | 4/2007 | Jibbe | 714/724 |
| 2008/0209567 A1 | 8/2008 | Lockhart et al. | |
| 2009/0199047 A1 | 8/2009 | Vaitheeswaran et al. | |
| 2011/0088014 A1 | 4/2011 | Becker et al. | |
| 2012/0060144 A1 | 3/2012 | Novak et al. | |
| 2013/0339930 A1* | 12/2013 | Xu | 717/125 |
| 2014/0181793 A1* | 6/2014 | Kaliappan | 717/124 |

OTHER PUBLICATIONS

PCT Application PCT/US2013/044811 International Search Report and Written Opinion dated Sep. 13, 2013, 9 pages.

* cited by examiner

*Primary Examiner* — Bryce Bonzo
*Assistant Examiner* — Jeison C Arcos
(74) *Attorney, Agent, or Firm* — Lathrop & Gage LLP

(57) ABSTRACT

A system and method for generating a specific level of software testing of algorithms and applications. A test plan, including input parameter values, expected output parameter values, and dataset size, is entered. The test plan is then executed, and results of the test are scored in accordance with predetermined software testing level definitions, yielding one of a predetermined possible testing levels achieved by the tested software.

14 Claims, 4 Drawing Sheets

| Index #<br>402 | Entry Process name<br>403 | Test procedure #<br>404 | Transition index #<br>405 |
|---|---|---|---|
| 1-small | | | |
| 1-medium | | | |
| 1-large | | | |
| | | | |

401 → Submit

FIG. 4A

| Index # | Entry Process name | Test procedure # | Transition index # |
|---|---|---|---|
| 1-small | Process-1 | TP-1 | 2-small  411 |
| 2-small | Process-2 | TP-2 | 3-small |
| 3-small | Process-3 | TP-3 | 0 |
| | | | |

Submit

SYSTEM AND METHOD FOR AUTOMATIC TEST LEVEL GENERATION

RELATED APPLICATIONS

This application claims priority to U.S. Patent Application Ser. No. 61/656,835, filed Jun. 7, 2012, the disclosure of which is incorporated herein by reference.

BACKGROUND

Currently, when software is purchased there is no direct indication of the quality of the software. It is generally recognized that quality assurance is primarily a function of testing. However, software testing standards are not consistent. Some organizations like the International Organization for Standardization with their ISO 90003 standard, or the Software Engineering Institute with their Capability Maturity Model Integration measure the maturity of the software creation process of an organization but do not determine the testing done on a application basis. Others like the Institute of Electrical and Electronics Engineers (IEEE 1044-1993) or the British Standard (BS 7925-2:1998), have direct standards for unit level testing only but still do not determine the testing actually performed on a application basis. Still other organizations like British Standards only govern testing terminology, per BS 7925-1.

Unfortunately, these existing standards do not provide a clear, concise indication to the public of exactly how much testing has been performed on a particular application. Thus, the public is left with only anecdotal measures of software quality.

SUMMARY

A system and method are disclosed for generating a specific level of software testing of algorithms and applications. A test plan, including input parameter values, expected output parameter values, and dataset size, is entered. The test plan is then executed, and results of the test are scored in accordance with predetermined software testing level definitions, yielding one of four possible testing levels achieved by the tested software.

BRIEF DESCRIPTION OF THE DRAWINGS

FIG. 4A is a diagram showing an exemplary test plan screen; and

FIG. 4B is an exemplary diagram showing test screen 400 annotated with errors.

DETAILED DESCRIPTION

Computing Environment

Figure 1:
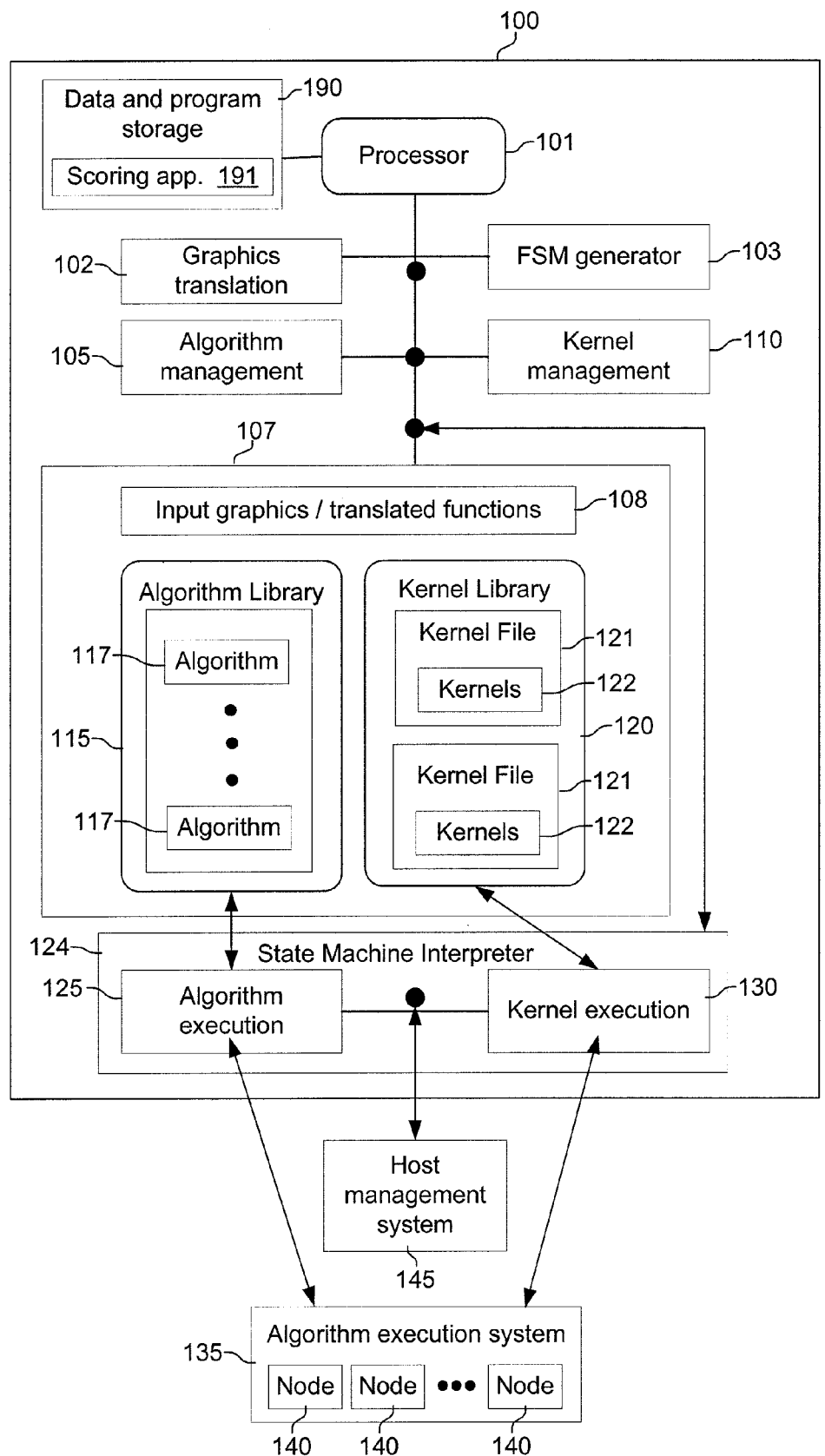
FIG. 1 is a system diagram showing an exemplary environment in which the present method operates.

FIG. 1 is an exemplary diagram of the computing environment in which the present system and method operates. As shown in FIG. 1, system 100 includes a processor 101 which executes tasks and programs including a kernel management module 110, an algorithm management module 105, state machine 124, a kernel execution module 130, and an algorithm execution module 125. System 100 further includes storage 107, in which is stored data including libraries 115/120 which respectively store algorithms 117 and kernels 122. Storage 107 may be RAM, or a combination of RAM and other storage such as a disk drive. Module 102 performs a translation of a graphical input functional decomposition diagram to corresponding functions (ultimately, states in a state machine), and stores the translated functions in appropriate libraries in storage area 108. Module 103 generates appropriate finite state machines from the translated functions.

System 100 is coupled to a host management system 145, which provides management of system functions, and issues system requests. Algorithm execution module 125 initiates execution of kernels invoked by algorithms that are executed. Management system 145 can be any external client computer system which requests services provided by the present system 100. These services include the presently-described automatic software test level generation.

The software for system services that are indicated below as being initiated by various corresponding menus and 'buttons' may be stored in data and program storage area 190.

Software Testing Levels

There are four software testing levels indicated by the present method—level 0, level 1, level 2, and level 3. These levels are described below.

Level 0 Testing

A level 0 test indication means that there is not enough information available to the system to perform a complete test. Typically this means that there is at least one code block or segment within an algorithm or application that has no unit level testing performed. According to McCabe, et al., the minimum testing which should be done to any multipath software code is at least one test per linear software block. Level 0 testing means that the McCabe minimum testing criteria is not provably met.

Level 1 Testing

A level 1 test indication means that the McCabe minimum testing criteria is met. The McCabe minimum testing criteria only insures that if a code block is entered with some input value and the expected output value is obtained then the test passes. The McCabe minimum test criteria does not insure that all boundary conditions of each transformed output variable for each code block have been tested. Level 1 test means that both the McCabe minimum testing criteria is met and the minimum, median, and maximum values for each transformed output data parameter have been individually tested as well.

Level 2 Testing

A level 2 test indication means that the Howard Minimum testing criteria has been met. Level 0 and level 1 testing does not insure that every code block entry method has been tested. Since a code block can be called in multiple ways, from different "other" code blocks, and since the overall system's conditions may effect the performance of a code block, the present 'Howard Minimum' test requires that each code block entry method have Level 0 and Level 1 testing performed. This is equivalent to testing a state at each state transition in a finite state machine, rather than only testing the states themselves.

Level 3 Testing

A level-3 test indication means that not only has every code block had every boundary condition of every code block tested, but that the sequencing (transitioning) between the code blocks is also correct. In level-3 testing, the system checks manually-entered expected transitions against the ones found when the code is tested.

Figure 2:
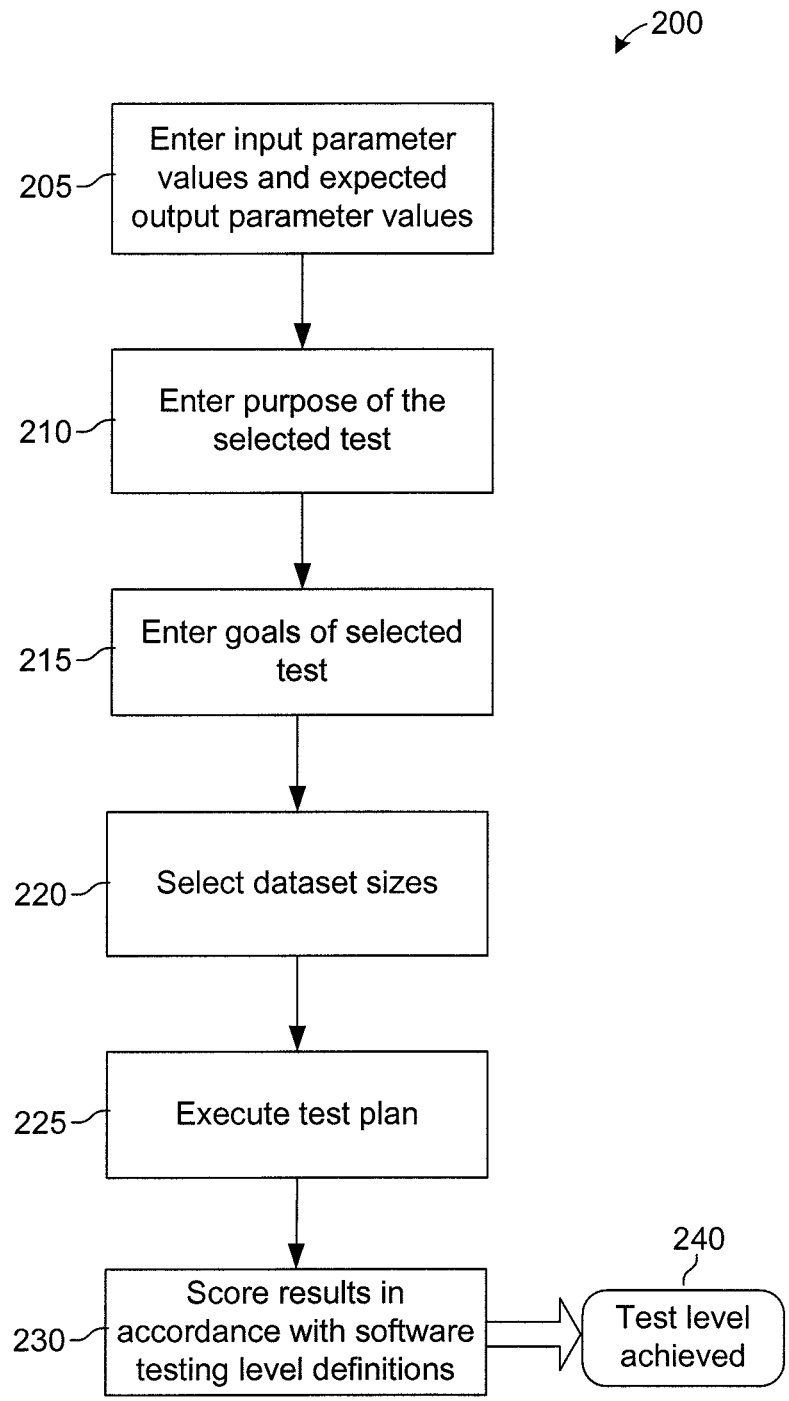
FIG. 2 is a flowchart of an exemplary algorithm for automatic test level generation.

FIG. 2 is a flowchart of an exemplary algorithm for automatic test level generation. Operation of the present system is best understood by viewing FIG. 2 in conjunction with FIGS. 3, 4A, and 4B, described below.

Generating Level 0-Level 2 Tests

In an exemplary embodiment, level 0 through 2 tests are generated by first accessing the desired project followed a right mouse click on a specific process which displays an options list. Selecting a test procedure button then causes a test procedure pop-up display to be shown. As shown in FIG. 2, at step 205, the input parameter values and the expected output parameter values for a selected test are entered and stored in system 100. If there is at least one process (code block) in an application that does not have an associated test procedure or at least one test procedure failed when executed then that application is at test level 0.

If all test processes (code blocks) pass when executed and there is at least one test procedure for every process, but there is at least one process does not have a high, medium, and low data set for the process then that project is at Test Level 1. If a project has high, medium, and low input parameters for all state transitions on every process then that project is at Test Level 2.

Generating a Level 3 Test

Figure 3:
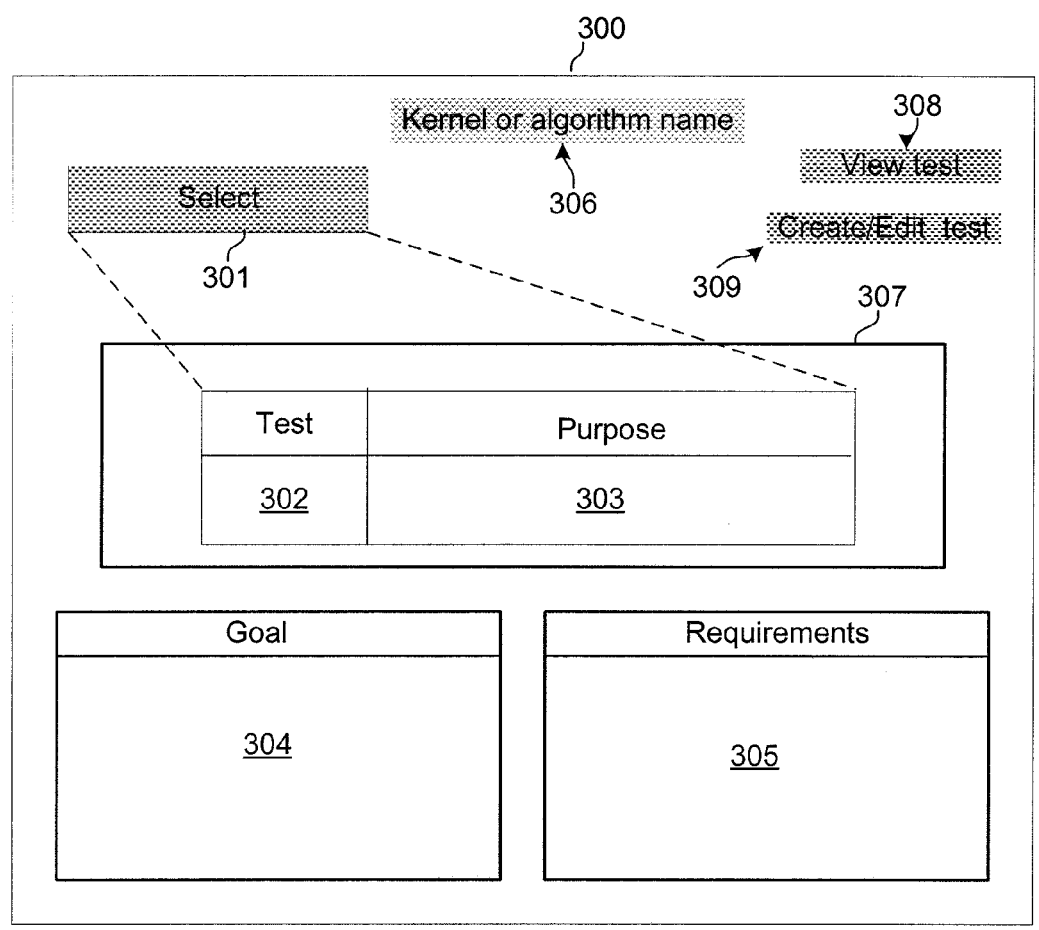
FIG. 3 is an exemplary diagram showing a test plan selection screen.

In an exemplary embodiment, selecting an appropriate button causes a test plan screen to be displayed. An MPT kernel is equivalent to a McCabe cyclomatic complexity basic code block, which is termed herein a 'McCabe code block'. An MPT algorithm is comprised of MPT kernels and/or other MPT algorithms. FIG. 3 shows an exemplary test plan selection screen 300. The name 306 of the currently selected MPT kernel or algorithm (code segment or block) to be tested is displayed at the top of the screen. A pull-down menu 307 or equivalent allows an administrator to view and select an already created test plan for the current MPT kernel or algorithm, via button 308.

As shown in FIGS. 2 and 3, to assist in later determining the correct test to select, a test's purpose can be displayed in response to entering its identifying number 302 after clicking on a 'select' button 301. At step 210, a developer describes the purpose of the current test via text box 303 on screen 300. An example of a purpose would be, "to insure that all error conditions of the xyz kernel are tested." The goal section of the screen is also a text box 304, which allows the developer, at step 215, to describe the overall goals of the current test. An example goal would be, "Ensure that input values greater than 10,000 display the following error message, Error—Input Value Too Large". Since the only valid rationale to adding some block of code to the system is because it meets some requirement, a list 305 of all requirements associated with the current MPT kernel or algorithm may be displayed. Thus list 305 is copied from a requirement traceability matrix or the like, such as that shown in Table 1, below, and displayed in a Rationale section on screen 300. The requirement traceability matrix connects a requirement to a design element, detailed design element, and one or more tests.

In order to view, create, or edit an actual test, either the View Test or the Create New Test button on screen 300 is selected. Selection of either button will cause test plan screen 400 to be displayed. FIG. 4A shows an exemplary test plan screen 400. As shown in FIGS. 3 and 4A, the View Test button 308 and Create/Edit Test button 309 on screen 300 both generate a similar screen display 400, with the exception that the Create/Edit test screen 400 additionally includes a submit button 401. As can be seen from FIG. 4A, there are four columns on the test screen 400: Index #402, Entry Process Name 403, Test Procedure number 404, and Transition Index number 405.

The Index # column contains a list of all possible test steps for one of three data set groupings: small, medium, or large. These groupings allow for one, two, or three dataset sizes to be selected to be tested, at step 220. If only one or two test dataset sizes are selected then, at most Test Level 2 can be obtained. If all three dataset sizes are tested then, up to Test Level 3 can be obtained. A developer can opt for only level 0 through level 2 testing by not entering a test plan.

It should be noted that the present test procedures are associated with design, as opposed to code. Only after the code has been attached to the design is it possible to execute the test procedures. In FIG. 4A, the Entry Process name 403 is the name of the design process that is to be accessed, and the top row of the table 400 indicates the first design process accessed. The test procedure number 404 is the particular test procedure used, including the current datasets that are executed. This means that regression testing occurs automatically in the present system. The Transition index number 405 is the next sequence step anticipated by the designer.

Selection of a "submit" button 401 causes the test plan to be executed on the selected code segment (kernel or algorithm), at step 225. There are two possible types of resultant errors: procedure and transition. FIG. 4B shows test screen 400 annotated with errors. A procedure error occurs when the return value received from the execution of a particular test procedure is an unexpected value. As shown in FIG. 4B, a procedure error is displayed in box 412 as the test procedure number in a color such as red. A transition error occurs when the anticipated transition placed on the test screen is different from the transition actually generated. As with a procedure error, a transition error is indicated in box 411 in a color such as red. Selecting the box 411 containing the procedure error causes the expected return and actual return values to be displayed. Selecting the transition error box 411 causes the actual transition to be displayed.

At step 230, scoring application 191 'scores' the results of test plan execution in accordance with the definitions of the software testing levels described above, and indicates the actual test level 240 achieved by the tested code.

Having described the invention in detail and by reference to specific embodiments thereof, it will be apparent that modifications and variations are possible without departing from the scope of the invention defined in the appended claims. More specifically, it is contemplated that the present system is

TABLE 1

EXAMPLE REQUIREMENT TRACEABILITY MATRIX

| ID | Text | High level design | Pseudo-code reviewed? | State machine reviewed? | Code file name | Test plan number | Test OK? |
|---|---|---|---|---|---|---|---|
| 1 | [text . . . ] | name1 | yes | yes | fname1 | plan1 | |
| 1.1 | [text . . . ] | name2 | yes | yes | fname2 | plan2 | |
| 2 | [text . . . ] | name3 | yes | yes | fname3 | plan3 | |

What is claimed is:

1. A computer-implemented method for indicating a specific level of testing of a software application comprising:
   determining a test plan to be executed on the application by establishing input parameter values, corresponding expected output parameter values, and datasets for the test plan;
   selecting between 1 and 3 dataset sizes to be applied to each code block in the application during execution of the test plan;
   executing, via a computer, the test plan on the application; and
   determining, via the computer, a testing level achieved during execution of the test plan by:
      assigning a testing level of 0 when there is not enough information available to the system to perform a complete test of each said code block in the application;
      assigning a testing level of 1 when McCabe minimum testing criteria is met by the application;
      assigning a testing level of 2 when each code block entry method successfully performs the level 1 testing; and
      assigning a testing level of 3 when every code block in the application has had every boundary condition successfully tested, and all transitions between the code blocks are correct.

2. The method of claim 1, wherein the McCabe minimum testing criteria is met if at least one code block is entered with a given input value, and the expected output value is obtained upon execution thereof.

3. The method of claim 1, wherein the test plan includes manually-entered expected transitions between each code block executed during execution of the test plan, further including:
   checking the expected transitions against the transitions found when the application executes the test plan; and
   generating a transition error report when an expected transition is different from the transition actually generated by the code block being tested.

4. The method of claim 1, wherein a procedure error is reported when the return value received from the execution of a part of the test plan is an unexpected value, and a transition error is reported when an expected transition is different from the transition actually generated by the code block being tested.

5. The method of claim 1, further including:
   associating, with said test plan, a list including the purpose of the test plan; and
   displaying the list in response to entering indicia identifying the test plan.

6. The method of claim 1, further including:
   associating, with one of the code blocks, a list of requirements associated with the code block; and
   displaying the list in response to entering indicia identifying the code block.

7. A computer-implemented method for generating a specific level of testing of a software application comprising:
   entering a test plan including input parameter values, expected output parameter values, and dataset sizes;
   executing the test plan on each code block in the application;
   scoring results of the executed test plan in accordance with software testing level definitions, to yield the specific testing level achieved by the code block, wherein:
      if there is at least one code block in the application that does not have an associated test procedure, or if at least one test procedure failed when executed, then the application is assigned a testing level of 0;
      if at least one code block does not have a high, medium, and low data set for the process, then the application is assigned a testing level of 1;
      if an application has high, medium, and low data set sizes for all state transitions between the code blocks, then the application is assigned a testing level of 2; and
      if every code block in the application has had every boundary condition successfully tested, and all transitions between the code blocks are correct, then the application is assigned a testing level of 3.

8. The method of claim 7, wherein the test plan includes manually-entered expected transitions between each code block executed during execution of the test plan.

9. The method of claim 7, wherein a procedure error is reported when the return value received from the execution of a part of the test plan is an unexpected value, and a transition error is reported when an expected transition is different from the transition actually generated by the code block being tested.

10. The method of claim 7, further including:
    associating, with said test plan, a list including the purpose of the test plan; and
    displaying the list in response to entering indicia identifying the test plan.

11. The method of claim 7, further including:
    associating, with one of the code blocks, a list of requirements associated with the code block; and
    displaying the list in response to entering indicia identifying the code block.

12. A system for indicating a specific level of testing of a software application comprising:
    a computer and associated memory; and
    a scoring application executing on the computer;
    wherein input parameter values, corresponding expected output parameter values, and datasets comprising a test plan to be executed on the application are entered and stored in the memory; and
    wherein, after the test plan is executed on the computer:
       if there is at least one code block in the application that does not have an associated test procedure, or if at least one test procedure failed when executed, then the application is assigned a testing level of 0;
       if at least one code block does not have a high, medium, and low data set for the process, then the application is assigned a testing level of 1;
       if an application has high, medium, and low data set sizes for all state transitions between the code blocks, then the application is assigned a testing level of 2; and
       if every code block in the application has had every boundary condition successfully tested, and all transitions between the code blocks are correct, then the application is assigned a testing level of 3.

13. The system of claim 12, wherein the test plan includes manually-entered expected transitions between each code block executed during execution of the test plan.

14. The system of claim 13, wherein a procedure error is reported when the return value received from the execution of a part of test plan is an unexpected value, and a transition error is reported when an anticipated transition is different from the transition actually generated by the code block being tested.

* * * * *

UNITED STATES PATENT AND TRADEMARK OFFICE
CERTIFICATE OF CORRECTION

PATENT NO. : 9,098,638 B2  
APPLICATION NO. : 13/913160  
DATED : August 4, 2015  
INVENTOR(S) : Kevin D. Howard Page 1 of 1

It is certified that error appears in the above-identified patent and that said Letters Patent is hereby corrected as shown below:

In the specification  
Column 1, line 21, "on a application" should read --on an application--;  
Column 1, line 25, "on a application" should read --on an application--;  
Column 3, line 7, "followed a" should read --followed by a--;  
Column 3, line 19, "process does not" should read --process that does not--;  
In the claims  
Column 6, line 61, "part of test" should read --part of the test--.

Signed and Sealed this  
Fifteenth Day of March, 2016

Michelle K. Lee  
*Director of the United States Patent and Trademark Office*